Figure 1:
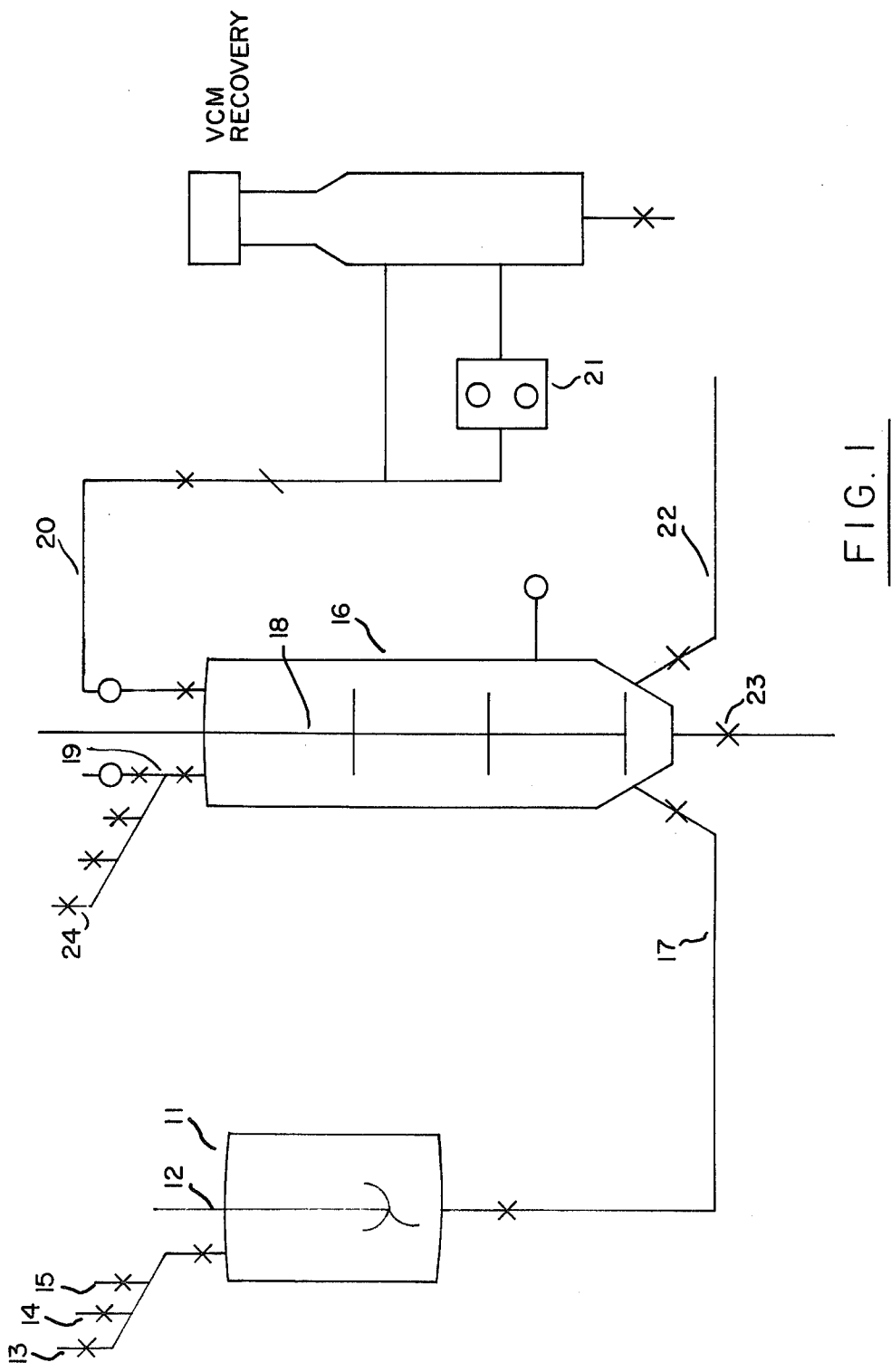

United States Patent [19]

Nickerson et al.

[11] 4,168,373

[45] Sep. 18, 1979

[54] REMOVAL OF RESIDUAL VINYL CHLORIDE MONOMER FROM POLYVINYL CHLORIDE LATEX

[75] Inventors: Richard G. Nickerson, Weston; Robert T. Bouchard, Gardner; Paul J. C. Hurtubise, Leominster, all of Mass.

[73] Assignee: Borden, Inc., Columbus, Ohio

[21] Appl. No.: 825,859

[22] Filed: Aug. 18, 1977

Related U.S. Application Data

[63] Continuation of Ser. No. 634,792, Nov. 24, 1975, abandoned.

[51] Int. Cl.$^2$ .............................. C08F 6/16; C08F 6/14
[52] U.S. Cl. ........................... 528/500; 159/DIG. 10; 260/29.6 PT; 526/344
[58] Field of Search ............... 528/499, 500; 526/344; 260/29.6 PT

[56] References Cited

U.S. PATENT DOCUMENTS

| | | | |
|---|---|---|---|
| 2,068,424 | 1/1937 | Mark | 526/344 X |
| 3,390,142 | 6/1968 | Benatta | 526/344 X |
| 3,654,248 | 4/1972 | Iida | 526/206 |
| 3,772,262 | 11/1973 | Clementi | 528/500 |
| 3,954,910 | 5/1976 | Kropp | 260/879 |
| 3,956,249 | 5/1976 | Goodman | 528/500 |
| 4,017,445 | 4/1977 | Grosse-Wortmann | 260/29.6 R |

FOREIGN PATENT DOCUMENTS

| | | | |
|---|---|---|---|
| 1248943 | 8/1967 | Fed. Rep. of Germany | 528/500 |
| 2331895 | 1/1974 | Fed. Rep. of Germany | 528/500 |

Primary Examiner—C. A. Henderson
Attorney, Agent, or Firm—George A. Kap; George P. Maskas; Daniel D. Mast

[57] ABSTRACT

An improved process for reducing the amount of residual vinyl chloride monomer in polyvinyl chloride latex to acceptable levels is provided. Carefully controlled sparging and defoaming removes the monomer without affecting physical properties of the latex.

5 Claims, 1 Drawing Figure

REMOVAL OF RESIDUAL VINYL CHLORIDE MONOMER FROM POLYVINYL CHLORIDE LATEX

This is a continuation, of application Ser. No. 634,792, filed Nov. 24, 1975 now abandoned.

This invention relates to an improved process for removing vinyl chloride monomer from polyvinyl chloride latexes, and more specifically to reducing the amount of residual monomer to acceptable levels as low as about 5 parts per million or less.

Polyvinyl chloride resin and latexes have been produced for many years by emulsion polymerization of vinyl chloride in the presence of a catalyst. For instance, patents such as that of Powers U.S. Pat. No. 2,520,959 relate to the process for preparing fluid polymer latexes using vinyl chloride and dispersing agents to produce the desired polymer particles. Some of the polymerizations have been carried out by starting with a seed latex, upon which the vinyl chloride polymerizes to make a long chain polymer of the proper size. Such a disclosure is in a co-pending patent application, Ser. No. 494,597, filed Aug. 5, 1974, now U.S. Pat. No. 3,935,151 issued Jan. 27, 1976.

In carrying out these polymerization processes, there has been an attendant problem of residual vinyl chloride monomer in the finished products. This is true, not only of resin produced by the polymerization of vinyl chloride, but also in the latexes produced as in accordance with the teachings of the Powers patent. There have been announcements of successful removal of vinyl chloride monomer from general purpose polyvinyl chloride resin by B. F. Goodrich (see American Paint and Coatings Journal, page 16 of Sept. 15, 1975). This licensed process reportedly involves feeding a resin slurry into a top of a stripping column and steam fed into the bottom of the column so that the steam rises to the top picking up vinyl chloride monomer on the way. This vinyl chloride monomer is removed at the top of the column and is recovered for reprocessing while the strip slurry is removed from the bottom of the column. The Goodrich process is not believed to be satisfactory for removal of vinyl chloride monomer from latexes. There is a particular problem with respect to removal of the vinyl chloride monomer from latexes in that the latex tends to coagulate. Polyvinyl chloride latex is very difficult to maintain stable in the aqueous system because of the hydrophobic nature of the polymer. At elevated temperatures redistribution of the stabilizing ion atmosphere of the emulsion polymer particle core lead to high grits formation or even coagulation, at temperatures above about 150° F., even though a given product may be stable for short time periods (¼ to 1 hour) at temperatures up to 220°-240° F. There is also always a potential problem of coagulation of the latex if unsuitable additions are made or the latex is subjected to other unfavorable conditions such as excessive agitation. The present invention is directed toward the removal of monomer from polyvinyl chloride homopolymer or copolymer latexes.

It is an object of this invention to reduce residual monomer content of polyvinyl chloride latex.

It is a further object to provide a batch process for the reduction of residual vinyl chloride monomer to levels below 10 parts per million based on total latex weight.

Other objects will become apparent from the complete description of the invention which follows.

SUMMARY OF INVENTION

The invention will be better understood by reference to the drawings, in which FIG. 1 shows the apparatus in which the invention is carried out.

A reactor 11 which is provided with a stirrer 12 is utilized to carry out the vinyl chloride polymerization. The ingredients including the seed latex, the vinyl chloride monomer and necessary surfactants and any other ingredients are added through valves 13, 14 and 15. The stainless steel reactor is provided with a temperature control jacket not shown. Stripper 16 is connected to reactor 1 by a transfer line 17 provided with suitable valves which control the flow of materials through the transfer line. Stripper 16 is provided with a three-bladed stirrer 18, and an inlet line at the top of the stripper for the introduction of defoamer. This inlet line and a suitable pressure guage is indicated by numeral 19. The stripper vessel likewise also has a suction line 20 that is connected to vacuum pump 21 with a suitable check valve and control valves in the suction line. The stripper tank also has a steam inlet line 22 provided with a steam injector. At the bottom of the stripper tank is an oulet pipe and valve 23 for removing the stripped latex product.

The multiple step process for stripping vinyl monomer from the polyvinyl chloride latexes may be summarized as follows:

STEP A.

Approximately 30 minutes prior to transfer of the batch from the polymerization reactor to the stripper (the residual VCM content of latex at this time will generally range from 2,000 to 6,000 parts per million) elevate the batch temperature to 150° F.–155° F. from the reaction temperature of about 125° F.

STEP B.

During the heat up period for the reactor, charge the defoamer, which has been diluted with three parts of water, to the stripper. When the defoamer is introduced into the stripper, the stripper tank has already been evacuated to 125 mm of mercury (absolute).

STEP C.

Once the specified batch temperature is reached, steam is introduced into the reactor to force the batch through the transfer line 17 to the stripper 16. A continuously pulling vacuum is applied to the stripper during transfer. The stripper has been pre-evacuated to 125–130 mm and the agitator has been turned on.

STEP D.

Upon completion of the transfer, which takes about 10 minutes, continue to pull a continuous vacuum until a vacuum of about 210 mm is reached.

STEP E.

With the batch in the stripper at 210 mm, steam sparge the batch for 45 minutes or until the batch temperature reaches 175° F., while continuing to pull a vacuum.

STEP F.

Following the steam sparge step continue to apply a continuous pulling vacuum for an additional 3-4 hours.

STEP G.

Following the strip period the batch is cooled and a sample is taken and analyzed to assure a vinyl chloride monomer residual of less than 10 parts per million.

When operating this apparatus to produce polyvinyl chloride latex, the polymerization is carried out in reactor 11 at 125° F. in a conventional manner. The feed time for introduction of vinyl chloride monomer is from 8-9 hours and the polymerization time is from 15-24 hours. The pressure within the reactor is not allowed to exceed about 80 psi. As the polymerization nears completion, the unpolymerized vinyl chloride content will drop to about 2,000 to 6,000 parts per million. An increase in temperature of the material in the reactor will result in a drop of pressure if the polymerization is progressing satisfactorily. Near the end of the polymerization time, the temperature within the reactor is increased to 150° F.-155° F. This is done not only to verify the completion of the polymerization (there is no corresponding drop in pressure) but also to allow transfer of the batch to the stripper at a temperature within the preferred range of from 110° F. to 175° F. There is some temperature loss during the 10-minute transfer of the 2,300 gallon batch to the stripper.

The improvements of this invention are centered about the transfer of the polymerized polyvinyl chloride homopolymer or copolymer to the stripper 16 and even more the exact manner in which the batch is treated within the stripper prior to storage.

Before transfer of the batch to the stripper vessel, the vessel is evacuated to 125-130 mm of mercury. Vacuum pump 21 is run continuously during and after transfer of the batch to stripper 16.

The batch is transferred by opening the valves in transfer line 17. Steam at 140 psi and 370° F. is introduced into the reactor through inlet valve 15 and this steam pressure combined with the vacuum already created in the stripper vessel causes the latex to move quickly into the stripper. Stirrer 18 is rotated to guarantee uniformity of the batch. Immediately prior to the transfer of the batch to the stripper, a reacted silica in light hydrocarbon oil defoamer (balab Bubble Breaker 3056A of Witco Chemical) is introduced into the stripper through valve 24 and inlet line 19. The defoamer is added in an amount to achieve 0.1% based on the total liquid weight. Before introducing the defoamer into the stripper, it is diluted with three parts of water. The defoamer, as supplied, weighs 7.5 pounds per gallon; the specific gravity is 0.9; and the viscosity is 50 cps all at 68° F.

After the latex has been transferred and the transfer line valves have been closed, 130 psi steam at 370° F. is introduced into the stripper 16 through inlet 22 with or without a steam injector nozzle. Steam is bubbled through the latex for about 45 minutes while the suction pump continues to run. The vacuum within the stripper goes from the original 125 mm mercury to about 650 mm during transfer and then drops back to about 210 mm whereupon the sparging is commenced. The temperature of the latex is not allowed to go above 175° F. since coagulation and loss of physical properties may result.

After sparging a vacuum is continuously pulled for an additional 3-4 hours. The latex is cooled and sample analysis reveals that the vinyl chloride monomer is reduced to less than 4 ppm and in some instances to as low as 0.5 ppm.

The following batches were produced:

|  | Ex. 1 | Ex. 2 | Ex. 3 | Ex. 4 | Ex. 5 | Ex. 64 |
|---|---|---|---|---|---|---|
| Batch Temperature at Transfer (°F.) | 155 | 154 | 155 | 130 | 153 | 150 |
| Transfer Time (Minutes) | 10 | 10 | 10 | 10 | 10 | 10 |
| Time in Hours From End of Transfer to Start of Steam Sparging at 22 inches Vacuum (210 mm mercury, absolute) | 0.8 | X | 0.8 | X | 4.0 | 1.6 |
| Length of Steam Sparge (Minutes) | 60 | 45 | 60 | 45 | 55 | 30 |
| Strip Time in Hours Following Steam Sparging Step | 4.0 | 3.0 | 4.0 | 3.0 | 4.0 | 3.0 |
| VCM in (P.P.M.) | 3.4 | 0.95 | 0.6 | 1.5 | 3.8 | 3.3 |

The amount of defoamer may be varied from 0.05 to 0.5% based on total liquid weight and is preferably from 0.1 to 0.2%. The steam sparge time is from about 15 to 80 minutes and preferably from 30-45 minutes. The strip time following steam sparging is from 1-8 hours and preferably from 3-4 hours. It is desirable to have the stripper vessel larger than the reactor vessel to accommodate foam that is formed. The stripper is 1.5 to 5 times larger than the reactor and preferably at least three times greater in volume.

Various defoaming agents may be used in addition to or as a substitute for the reacted silica in hydrocarbon solvent. These agents are generally a mixture of substances such as those listed in Commerce Clearing House, Inc.'s Food Drug Cosmetic Law Reports, 21 CFR 21.2257, paragraph 56.907, pp. 55995-55998. Although these are approved for food products, this list includes the reacted silica and odorless light petroleum hydrocarbons, paragraph 121.2594, 121 CFR 121.2595, such as that used in the present invention.

Although specific embodiments of the invention have been given, obvious variations and modifications can be made within the spirit and scope of the appended claims.

We claim:

1. In a process for producing fluid polymer latex from vinyl chloride monomer that includes adding vinyl chloride monomer, a catalyst, water and a dispersing agent to a reaction zone and controlling the temperature of the contents of the reaction zone to promote complete polymerization of polyvinyl chloride latex without coagulation, the latex containing residual vinyl chloride monomer, the improvement comprising the step of reducing residual vinyl chloride monomer content to an acceptable health standard level of 10 parts per million or less while maintaining a stable uncoagulated fluid latex by:

(1) providing a stripping zone separate from the reaction zone and larger than the reaction zone so that the fluid polymer latex and remaining monomer can be transferred thereto and foamed;

(2) raising the temperature to below about 175° F. within the reaction zone after polymerization is complete and before the fluid polymer latex is transferred to the stripping zone;

(3) partially evacuating said stripping zone before transfer of the latex thereinto;

(4) introducing a defoaming agent into said evacuated zone before transfer of the latex thereinto;

(5) transferring the fluid polymer latex from the reaction zone to the stripping zone by using differential pressure caused by evacuation of the stripping zone and the application of pressure to the latex in the reaction zone;

(6) stirring the transferred polymer latex continuously and in a manner to avoid coagulation of the latex;

(7) continuing the stirring of the fluid polymer latex and the evacuation of the stripping zone while simultaneously introducing steam into the fluid polymer latex to (a) form bubbles within the latex, (b) to increase the temperature of the latex and burst the bubbles, and (c) to sweep the vinyl chloride monomer from the burst bubbles and from the polyvinyl chloride latex particles in the stripping zone; and (8) stopping the introduction of steam while continuing the stirring of the polymer latex and the evacuation of the stripping zone to reduce residual vinyl chloride monomer to less than 10 parts per million.

2. Process of claim 1 wherein temperature of the contents of the reaction zone is increased to about 150 to 155° F. prior to the transfer of the fluid polymer latex to the stripping zone.

3. Process of claim 2 wherein the stripping zone is evacuated to about 125 to 130 millimeters of mercury prior to transfer of the fluid polymer latex to the stripping zone and wherein the latex is transferred to the stripping zone from the reaction zone in about 10 minutes.

4. Process of claim 3 wherein the defoamer is reacted silica in a light hydrocarbon oil and amount of the defoamer is 0.05 to 0.5% based on total liquid weight whereas steam introduced into the stripper is at about 370° F. and about 130 psi.

5. Process of claim 3 wherein the step of introducing steam into the stripper is commenced when vacuum therein is about 210 millimeters and wherein initial concentration of the vinyl monomer in the latex is about 2,000 to 6,500 ppm.

* * * * *

UNITED STATES PATENT OFFICE
CERTIFICATE OF CORRECTION

Patent No. 4,168,373  Dated September 18, 1979

Inventor(s) R. G. Nickerson, R. T. Bouchard, P. J. Hurtubise, K.T. Cardner

It is certified that error appears in the above-identified patent and that said Letters Patent are hereby corrected as shown below:

Col. 2, line 13, change "1" to --11--;

First page under (75) Inventors:

add --Kenneth T. Cardner, Sterling, Mass.--

Signed and Sealed this

Fourth Day of March 1980

[SEAL]

Attest:

SIDNEY A. DIAMOND

Attesting Officer

Commissioner of Patents and Trademarks